(12) United States Patent
Soni et al.

(10) Patent No.: US 8,911,542 B2
(45) Date of Patent: Dec. 16, 2014

(54) ANTI-CORROSIVE COMPOSITIONS

(75) Inventors: Samir H. Soni, Bangalore (IN); Dhritisunder Bhattacharya, Bangalore (IN)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 13/994,149

(22) PCT Filed: Dec. 15, 2011

(86) PCT No.: PCT/US2011/065090
§ 371 (c)(1),
(2), (4) Date: Jun. 14, 2013

(87) PCT Pub. No.: WO2012/082993
PCT Pub. Date: Jun. 21, 2012

(65) Prior Publication Data
US 2013/0280543 A1    Oct. 24, 2013

(30) Foreign Application Priority Data
Dec. 16, 2010 (IN) ............... 3865/CHE/2010

(51) Int. Cl.
*C09D 5/08* (2006.01)
*C09D 7/00* (2006.01)

(52) U.S. Cl.
CPC ............ *C09D 5/086* (2013.01); *C09D 7/002* (2013.01)
USPC .......... 106/14.29; 106/14.05; 106/14.26; 106/14.41; 106/14.42; 106/14.44; 252/389.1; 252/389.3; 252/389.61; 428/450; 428/470

(58) Field of Classification Search
CPC ........... C09D 5/084; C09D 5/086; C09D 5/08
USPC .......... 106/14.05, 14.26, 14.29, 14.41, 14.42, 106/14.44; 252/389.1, 389.3, 389.61; 428/450, 470
See application file for complete search history.

(56) References Cited

U.S. PATENT DOCUMENTS

| | | | |
|---|---|---|---|
| 3,453,124 A * | 7/1969 | Wurstner | 106/14.26 |
| 3,565,843 A * | 2/1971 | Kassinger | 524/166 |
| 3,847,651 A | 11/1974 | Holden | |
| 3,925,087 A * | 12/1975 | Lechner et al. | 106/14.25 |
| 4,086,170 A * | 4/1978 | De Clippeleir et al. | 508/396 |
| 4,631,083 A * | 12/1986 | Christhilf et al. | 106/14.23 |
| 4,718,942 A * | 1/1988 | Laura et al. | 106/14.29 |
| 4,729,791 A * | 3/1988 | Laura et al. | 106/14.23 |
| 4,861,824 A * | 8/1989 | Petrillo et al. | 524/745 |
| 4,997,584 A * | 3/1991 | Jao et al. | 508/401 |
| 5,338,347 A * | 8/1994 | Rohr et al. | 106/14.44 |
| 5,407,471 A * | 4/1995 | Rohr et al. | 106/14.44 |
| 5,455,075 A * | 10/1995 | Longo | 427/398.1 |
| 5,491,031 A | 2/1996 | Seibel | |
| 5,578,235 A * | 11/1996 | Jao et al. | 508/391 |
| 6,191,056 B1 | 2/2001 | Vogt | |
| 6,211,262 B1 * | 4/2001 | Mejiritski et al. | 522/71 |
| 6,331,202 B1 * | 12/2001 | Pipko | 106/14.37 |
| 2007/0014924 A1 | 1/2007 | Mertens | |
| 2007/0152192 A1 | 7/2007 | Kirk | |
| 2007/0232785 A1 | 10/2007 | Weber | |

FOREIGN PATENT DOCUMENTS

| | | | | |
|---|---|---|---|---|
| CA | 2057196 A1 * | 6/1998 | | C07C 303/32 |
| JP | 2009-227744 A * | 10/2009 | | C09D 191/06 |

OTHER PUBLICATIONS

PCT International Search Report for PCT/US2011/065090, mailed Mar. 7, 2012.

* cited by examiner

*Primary Examiner* — Anthony J Green

(57) ABSTRACT

The invention relates to an anti-corrosive composition comprising an active material of formula I wherein R is an aliphatic chain of $C_{12}$ to $C_{20}$ and $n \leq 20$; an anti-corrosive pigment, a filler mixture, and a diluent or carrier. The invention also relates to a process for preparing the anticorrosive composition and a metal substrate having a coating comprising the anti-corrosive composition.

22 Claims, 2 Drawing Sheets

ANTI-CORROSIVE COMPOSITIONS

FIELD OF INVENTION

The present invention relates to anti-corrosive compositions. Particularly, the invention is directed to provide a corrosion preventive, sprayable coating for direct application on metals. More particularly, the present invention relates to an environmentally safe and effective anti-corrosive composition that exhibits excellent anti-corrosion activity and wide applicability under a broad range of temperatures and in other corrosion inducing environments such as salinity, humidity and the like.

BACKGROUND OF INVENTION

Metal surfaces are often prone to corrosion particularly when they are exposed to moisture in air, salt and acid/alkaline conditions. Since the process of corrosion is a gradual phenomenon, it is seldom noticed by the user before it produces sufficient damage. Metal panels commonly used in the automobile industry at different parts of the world are usually subjected to corrosion due to their exposure to adverse environments such as humidity, saline conditions at coastal regions, extremely hot and cold weather conditions. However, there are several ways of controlling corrosion. The selection of an anti-corrosive mechanism depends on safety conditions, economics and technical considerations. The most commonly used method of controlling corrosion to metal surfaces is by means of protective coatings in the form of paint or a coating material.

A wide range of coating materials is known in the art. For instance U.S. Pat. No. 3,847,651 discloses a process for providing an opaque waterproof protective coating film on a substrate which comprises a non-polar polymer dissolved in a non-aqueous solvent. U.S. Pat. No. 5,491,031 discloses a coating composition for metal substrates wherein the composition is free of a halide-containing vinyl polymer and comprises an epoxy novolac resin, a phenolic resin, polyester and an elastomer in a nonaqueous carrier. U.S. Pat. No. 6,191,056 discloses metallized, particularly aluminized, fabrics which are coated with specific polyurethane finishes and primer coatings comprising novel phosphate containing primers. EP 1712300 A discloses a method for coating metal surfaces with corrosion inhibiting polymer layers. US 2007/0014924 discloses a method for coating metal surfaces with corrosion inhibiting polymer layers. The composition disclosed therein comprises an organophosphorus compound comprising phosphorus and an alkyl group capable of interacting with a plastic monomer resin.

US 2007/0152192 discloses a zinc-rich preconstruction primer coating composition which includes a zinc powder dispersed in a polyurethane vehicle to which is added a curing catalyst to produce a moisture cured extended durability coating that is weldable.

Some of the already existing coating compositions have a zinc component which is widely used for its anticorrosive property. However, zinc containing compositions are not favoured in automobile industry due to the reason that zinc is a heavy metal and considered to be toxic at certain concentrations. Zinc chromate is one of the traditional anticorrosive pigments most frequently used in the formulation of primers. However, its environmental aggressiveness, toxicity and carcinogenic properties severely restrict its use and several alternatives were proposed to replace zinc chromate, zinc phosphate being one of them. Further, it has been reported that zinc phosphates may retard the growth of aquatic organisms and, therefore, is also becoming a target of ecological concern.

Zinc phosphate and zinc oxide are designated as ecologically harmful substances in some European countries for this reason. Due to the growing awareness to the environmental harm associated with heavy metals, the market has been seeking non-toxic and cost effective replacements.

Further, although most of the coating materials exhibit the basic requirements like anticorrosion property, there is always a shortfall of OEM [Original equipment manufacturer] requirements such as drying, stickiness, and sagging. Also, during application, these products demand additional stabilization equipment to control and maintain sprayability, anti-settling and sagging requirements. In addition use of a zinc/epoxy based systems involves a complicated processes in application and use which makes it commercially not viable.

A need exists, therefore, for non-toxic anticorrosive pigment compositions free from harmful heavy metals and zinc, which will eliminate or ameliorate disadvantages associated with known non toxic pigment compositions and also completely fulfill all requirements regarding efficacy of anti-corrosive activity, processability and environmental safety.

OBJECT OF THE INVENTION

According to the present invention, there is provided an environmentally safe and effective anti-corrosive composition comprising a non-toxic anti-corrosive pigment carried by a lubricating thickening agent coupled with a rheological additive to increase anti-corrosion and anti-sagging efficiency over a wider application temperature.

The main objective of the present invention is to provide a corrosion preventive sprayable coating for direct application on metal surface. Accordingly one embodiment of the present invention relates to an anti-corrosive composition comprising an active material of formula

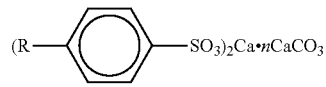

wherein R is an aliphatic chain of $C_{12}$ to $C_{20}$ and $n \leq 20$; an anti-corrosive pigment, a filler mixture, and a mineral oil which acts as a diluent or carrier.

Another embodiment of the present invention relates to a process for preparing the anticorrosive composition. A further embodiment of the present invention relates to a metal substrate having a coating comprising the anti-corrosive composition.

The anti-corrosive composition of the present invention also meets the standard requirements of OEM. The composition exhibits anti-corrosive product stability and applicability over a wide range of temperature. This property of the composition of the invention is valuable for substrate having a narrow region. For instance, the interior panel in an automobile has several narrow regions and contours which are susceptible to corrosion. Such areas are not protected by the conventional coatings due to the reason that the coating materials that are currently available in the market lack adequate viscosity which in turn render the coating material reaching the desired region difficult. The present invention overcomes the above mentioned drawbacks.

More particularly, the anti-corrosive composition of the present invention maintains stable application viscosity in the range of −10° C. to 100° C.

Other features and advantages of the present invention will become apparent as the following detailed description proceeds.

DETAILED DESCRIPTION OF INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about".

Embodiments of the present invention relate to non-toxic anti-corrosive compositions for inhibiting corrosion of metallic surfaces. The composition has advantages such as maintenance of stable viscosity across a broad temperature range and thereby can be applied to metal substrates with complex geometric contours with ease.

Corrosion is herein defined as an electrochemical process that seeks to reduce the binding energy in metals. It is a chemical or electrochemical reaction between a material, usually a metal, and its environment that produces a deterioration of the metal and its properties. The process of corrosion is as an anodic reaction process, whereby metal-dissolving ions are generated. The process occurring at the anodic site is the dissolution of metal as metallic ions, and converting these ions into insoluble corrosion products, such as rust.

Metal or metallic is defined herein as any substance susceptible to corrosion.

Accordingly, the present invention relates to anti-corrosive compositions having increased anti-corrosion and anti-sagging efficiency over a wide temperature range. The anti-corrosive composition of the invention comprises an active material of formula

Figure 1A:
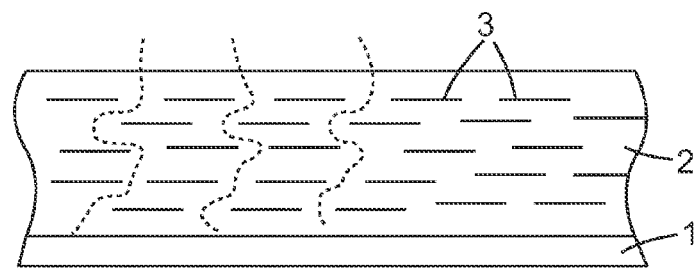
FIG. 1a: Side view representing the rigid matrix formed, that extends the diffusion pathlength for water, oxygen, and corrosion-enhancing ions to reach the metal substrate increasing corrosion resistance.
Figure 1B:
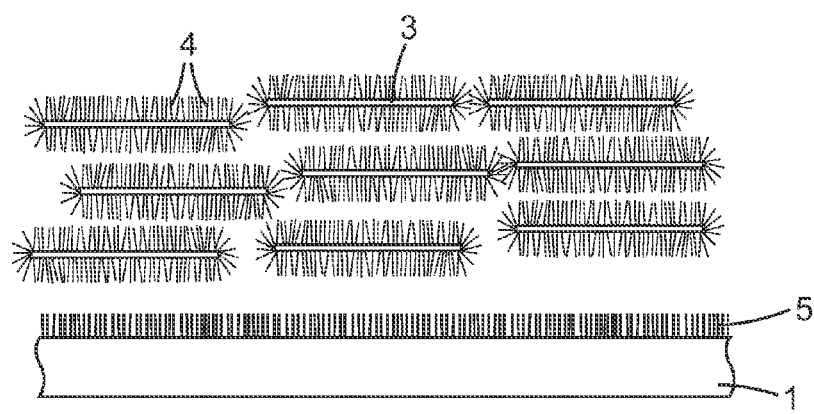
FIG. 1b: Side view representing the platelets of the active material formed over the metal surface that form a barrier to air, moisture, and carbon dioxide to reach the metal surface.

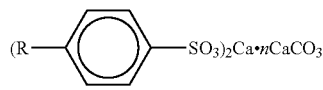

wherein "R" is an aliphatic chain of $C_{12}$ to $C_{20}$ and $n \leq 20$; an anti-corrosive pigment, a filler mixture, and a diluent or carrier. The key elements of the active material are the alkyl group "R" and the aromatic ring with the $SO_3$ group attached. The aromatic ring and $SO_3$ are highly polar. This results in coatings with excellent metal wetting and moisture displacement properties. The polar end of the sulfonate/carbonate complex attaches to metallic substrates and demonstrates exceptional adhesion even when the coating film is damaged. The alkyl group is a non-polar and mostly aliphatic chain mixture preferably with $C_{12}$ to $C_{20}$ atoms. Alkyl groups attached to the aromatic ring face away from the substrate and repel the ingress of moisture. The carbonate in the structure functions to buffer pH at the coating/metal interface, thus inhibiting corrosion. The Calcium carbonate portion of material is in the form of small hexagonal platelets (3). These platelets perform several functions, including adding mechanical integrity to the film, increasing the path length for corrosives and imparting thixotropy. FIGS. 1 (a) and (b) shows how the presence of millions of these platelets (3) in a matrix of wax, resin, or oil (2) increase the distance which water and oxygen must travel to reach the substrate (1), resulting in improved corrosion resistance. These platelets thus form a barrier to air, moisture, and carbon dioxide to reach the metal surface, thereby stopping the electrochemical reaction process, and thus preventing corrosion.

Thus, one of the significant modes of action of the present composition is to considerably extend the diffusion path lengths for water, oxygen, and corrosion-enhancing ions thus inhibiting corrosion.

Figure 2:
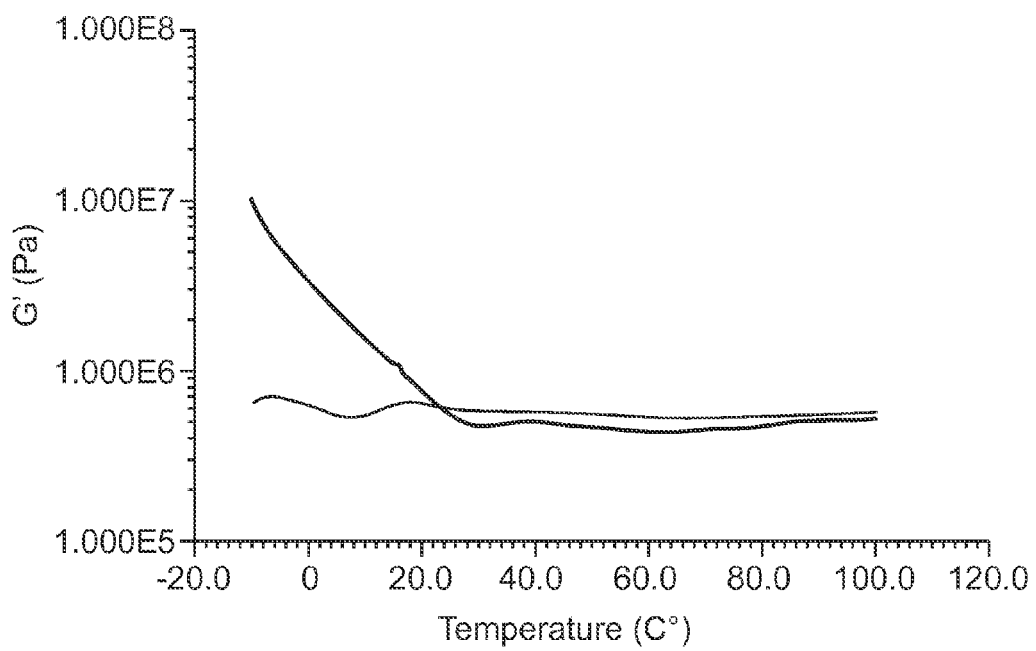
FIG. 2: Graphical representation of the viscosity stability of the composition over a temperature range of −10° C. to 100° C.

As shown in FIG. 2, all sulfonate molecules (4) are associated with platelets (3). The excess sulfonate (5) migrates to the metal surface (1), providing a strong wetting action, which actually displaces water. The resulting monomolecular film of sulfonate provides protection to the metal surface even when the film above it is damaged or partially removed.

In one of the embodiments of the present invention the active material is present in the coating composition of the present invention in an amount of up to 45 parts of the mixture, or in some cases upto 40 parts of the mixture, or in some cases 30 parts of the mixture with the parts being considered based on the total weight of the coating composition. Preferably, the anti-corrosive composition comprises 30-45 parts of the active material.

The anti-corrosive pigment used in the composition of the present invention is preferable an Oxyamino phosphate of magnesium [OAPM]. The composition of the present invention comprises at least one part by weight of the anti-corrosive pigment, more preferably 1 to two parts by weight. The most important parameter of the protection mechanism by OAPM forms a continuous film which is composed of oxidized Magnesium and Phosphorus helping to maintain the surface potential below the corrosion values thus improving the cathodic surface protection. Instances where the bare metal experiences weld/surface damage, the cathodic protection enhances the anti corrosion performance. This effect is illustrated by the results which demonstrate superior properties of the composition of the present invention which is detailed below.

Fillers-Inorganic fillers are solids that are present in a finely divided form in the composition. Fillers have two tasks; on the one hand they are to bring down the cost of a product in the conventional sense and ensure that, in comparison with products that are not filled, it has improved or additional, new properties, and on the other hand the use of fillers is often to facilitate the ease of production.

In addition to the cost-lowering effect, fillers also have an influence upon the rheology, that is, thickening and, if applicable, thixotropy, by means of controlled adjustment of a time-dependent structural viscosity, for example by means of kaolin, talc and wollastonite. In general, the flow behavior is also affected by fillers. Although any of the aforementioned, or other, mineral fillers may be employed for such purpose, particularly preferred mineral filler in view of the present invention is silica-kaolinite.

The coating composition may comprise, in yet another aspect of the invention, a mineral filler selected from the group consisting of Silica-kaolinite mixture.

According one of the significant aspects of the invention, it has been found that the filler mixture provides anti-sagging property to the composition of the present invention.

It is therefore the object of the present invention to make available anti-corrosive composition with fillers of the kind described which, in addition to the influences that they have on the rheological behavior confer a clearly improved anti-sagging properties to the substrate.

The filler mixture most preferably used in the composition of the present invention is $SiO_2$—$Al_2[(OH)_4Si_2O_5)]$. It provides very good dispersion properties, high abrasion resistance, very good flatting effect and good transparency to the anti-corrosive composition. It has outstanding dispersion behavior & low tendency to settle. The filler mixture provides anti-sagging property to the anti-corrosive composition.

In one of the embodiments of the present invention the filler mixture is present in the coating composition of the present invention in an amount of upto 40 parts of the mixture, or in some cases upto 35 parts of the mixture, or in some cases 30 parts of the mixture with the parts being considered based on the total weight of the coating composition. Preferably, the filler mixture comprises 35 to 40 parts of the active material.

A preferred diluent/carrier is mineral oil.
The proportion of mineral oil may vary according to the desired consistency of the composition. Examples of mineral oil include spindle oil, machine oil, cylinder oil, turbine oil lubricating oils, light oils, brake fluids, antifreeze or synthetic lubricating oils and the like.

In one of the embodiments of the present invention the diluent/carrier is present in the coating composition of the present invention in an amount of upto 15 parts of the mixture, or in some cases upto 13 parts of the mixture, or in some cases 10 parts of the mixture with the parts being considered based on the total weight of the coating composition. Preferably, the anti-corrosive composition comprises 10-13 parts of the diluent/carrier.

The anti-corrosive compositions of the present invention are prepared by a process which comprises the steps of stirring the active material of formula

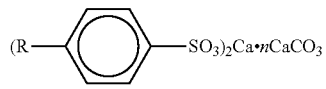

wherein R is an aliphatic chain of $C_{12}$ to $C_{20}$ and n≤20; adding an anti-corrosive pigment and a filler mixture slowly enough to the stirred active material so that they disperses quickly in active material and mixed and stirred to form a blend; adding a mineral oil and mixing it followed by filtering the resulting product through a 300 mesh filter. Care is taken to ensure that at every process step, the formed blend is dispersed thoroughly before each ingredient is added. More particularly, the active material and the anti-corrosive pigment is mixed for 10-30 min and stirred at 1000-2000 RPM to form a blend.

Considering both tropical and sub-tropical environment application conditions, the viscosity of the anti-corrosive compositions so obtained was measured as a function of temperature. Unexpectedly, the compositions exhibited stable viscosity over a temperature of −10° C. to 100° C. Thus the present invention provides a way to resist corrosion in both the extreme climatic conditions.

The coating compositions of the present invention have broad utility for protecting all possible metallic substrates susceptible to corrosion, including ferrous substrates such as iron [Fe] and steel as well as Aluminum [Al], Copper [Cu], Magnesium [Mg], and alloys thereof as well as other conventional metals employed in any structural applications where corrosion may occur due to contact by atmospheric moisture, water, salinity, humidity or other corrosives normally present in urban or industrial environments.

Compositions of the present invention may be applied as a single coating, for example, as a clear coat and/or a topcoat; as a basecoat in a two-coat composition; or as a layer of a multi-component coating, for example, as a primer layer, basecoat and/or topcoat layer, and/or as a clear coat layer. Compositions of this invention are useful, for example, as a primer, a basecoat, a topcoat, and/or a clear coat applied either directly onto the substrate surface itself or disposed onto prior underlying coating(s) and/or treatment(s), e.g., an inorganic or organic treatment, a primer, and/or basecoat material, disposed on the substrate surface to achieve a desired result. In certain embodiments, the coating compositions of the present invention may be directly applied onto the bare or primed metal itself.

Compositions of the present invention can be applied to a substrate to be treated by conventional coating techniques such as, for example, spray coating, brush coating, dip coating, direct roll coating, reverse roll coating, curtain coating, and combinations thereof, among other methods. Preferably, compositions of the present invention are applied by a paint spray gun.

The present invention is advantageous in that, the composition maintains stable application viscosity in the range of −10° C. to 100° C.

In one of the embodiments of the present invention the anti-corrosive pigment is present in the coating composition of the present invention in an amount of about 1 to 5 parts of the mixture with the parts being considered based on the total weight of the coating composition. Preferably, the anti-corrosive pigment comprises 1-2 parts of the active material.

According to a further aspect of the invention a test panel coated with a control composition (Reference Sample) and compositions as per the current invention (Sample A-E) were subjected to various tests to evaluate the effect on viscosity, application properties, sag resistance and corrosion resistance.

A sag test is conducted to determine the sag-resistance of a metal test panel subsequent to coating with a sample composition. A metal panel is coated with the sample composition and allowed to cool. The coated panel is then suspended vertically for 24 hours. The movement is measured below a reference line.

A corrosion resistance test is conducted on a metal test panel with a coating of the composition prepared in accordance with the current invention. More specifically the corrosion resistance test is the salt spray test. The salt spray test is a standardized test method used to check corrosion resistance of coated samples. The appearance of corrosion products is evaluated after a period of time. Test duration depends on the corrosion resistance of the coating; the more corrosion resistant the coating is, longer the period in testing without showing signs of corrosion.

More particularly this test method covers the treatment of previously painted or coated specimens for accelerated and atmospheric exposure tests and their subsequent evaluation in respect to corrosion, blistering associated with corrosion, loss of adhesion at a scribe mark, or other film failure. This method therefore provides a means of evaluating and comparing basic corrosion performance of a substrate, pretreatment or coating system or combination thereof, after exposure to corrosive environments.

The compositions of the present invention (Sample A-E) were also subjected to a permeation test, natural weathering test and heat cycle test.

The following examples illustrate certain embodiments and aspects of the present invention and not to be construed as limiting the scope thereof. All parts and percents therein are by weight unless otherwise indicated.

EXAMPLES

The composition of the present invention was prepared by weighing 45 parts of the active material $(R—C_6H_5—SO_3)_2Ca \cdot nCaCO_3$ [R=aliphatic $C_{12}$-$C_{20}$; $n \leq 20$]—Calcium sulfonate weighed to an accuracy of +/−0.01 Kg; 1 to 2 parts of an anti-corrosive pigment and 35 to 40 parts of a filler mixture was added slowly to the stirred active material so that they disperse quickly in active material and the mixture was mixed for 20 min and stirred at 1500 RPM to form a blend; 10 to 13 parts of a mineral oil was added and mixture was mixed for 10-30 min; the resulting product was filtered through a 300 mesh filter.

For the purpose of reference, control formulation ('Reference Sample') was prepared as provided in Table 1 which comprises only the active material and the carrier. The anti-corrosion formulations (Sample A-E) in accordance with the present invention are as provided in Table 1.

TABLE 1

| Sample | Active material | Anti-corrosive Pigment | Filler mixture | Diluent/carrier |
|---|---|---|---|---|
| Reference Sample | 63 | — | — | 37 |
| A | 45 | 1 | 20 | 33 |
| B | 20 | 2 | 45 | 33 |
| C | 20 | 2 | 20 | 58 |
| D | 56 | 1 | 30 | 13 |
| E | 45 | 2 | 40 | 13 |

The compositions of the present invention (Sample A-E) were applied on test panels for evaluating the various performance attributes such as application properties sag resistance etc. The following are details of the test method. Comparison of the compositions of the current invention (Sample A-E) with the Reference sample indicates the advantageous attributes conferred by the current invention. The anti-corrosion compositions of the present invention facilitate quick drying time, non-sticky coating on the metal substrate with no sagging, better corrosion resistance and permeation. Therefore the anti-corrosive composition of the present invention (Sample A-E) demonstrates both high efficiency in terms of corrosion resistance and also meets the standard OEM requirements. The results of the same are tabulated in Table 2.

TABLE 2

| Sample | Sag result | Cyclic corrosion | 5% salt spray corrosion | Heat cycle | Permeation length | Drying time |
|---|---|---|---|---|---|---|
| Reference Sample | 0.0 | 150 cycles 150 hrs | 1000 hrs | 273 cycles | 22 mm | Non Drying |
| A | 0.6 | 80 cycles 800 hrs | 800 hrs | 240 cycles | 8 mm | 20 hrs |
| B | 0.4 | 40 cycles 400 hrs | 500 hrs | 170 cycles | 0 mm | 5 hrs |
| C | 0.0 | 45 cycles 450 hrs | 300 hrs | 200 cycles | 5 mm | 9 hrs |
| D | 0.5 | 150 cycles 1500 hrs | 1000 hrs | 264 cycles | 16 mm | 20 hrs |
| E | 0.8 | 120 cycles 1200 hrs | 1000 hrs | 240 cycles | 10 mm | 7 hrs |

Example 1

Sag Test

Masking is applied on lower half of the test piece and after applying 300μ thick coating in the test piece, the masking is peeled off immediately. The test piece is kept horizontally for 30 minutes at 40±2° C. The length (mm) of sagging is measured immediately after removing the masking. The degree of sag is ascertained by the addendum fraction. Higher the value of addendum fraction lower is the degree of sag.

| Addendum Fraction | Degree of sag |
|---|---|
| 0.0 | Complete |
| 0.2 | Almost complete |
| 0.4 | Somewhat more than half |
| 0.5 | Half |
| 0.6 | Somewhat less than half |
| 0.8 | Slight (just touching) |

The results of the sag test are tabulated in Table 2 with the reference sample along with those of the present invention demonstrating the better results with minimal sagging.

Example 2

Cyclic Corrosion Test

Natural Weathering Test

The test piece was subjected to a test cycle as per the parameters provided below 5% salt spray—2 hours
Dry (60 Deg. C./20-30% RH)—4 hours
Wet (50 Deg. C./95% RH)—4 hours The results of the natural weathering test (Cyclic corrosion test) are tabulated in Table 2 with the reference sample along with those of the present invention.

Example 3

Corrosion Resistance Test

5% Salt Solution in Salt Spray Test

The test is performed in an apparatus for testing consisting a closed testing chamber, where a salted solution (mainly, a solution of sodium chloride) is atomized by means of a nozzle. This produces a corrosive environment of dense saline fog in the chamber such that the metal parts exposed are attacked under accelerated corroding atmosphere.

The metal test piece is exposed to standardized 5% solution of NaCl known as NSS (neutral salt spray). The results are represented as testing hours in NSS without appearance of corrosion products.

The results of the 5% salt spray test are tabulated in Table 2 with the reference sample along with those of the present invention.

Example 4

Heat Cycle Test

The test material is applied on the test pieces so as to form a membrane of standard thickness (dry film thickness of 50 microns). The test piece is subjected to 10 circles as per the parameters provided below
Circle:
 −30+/−2 deg C. for 1.5 hours
 80+/−2 deg C. for 1.5 hours
The results of the heat cycle test are tabulated in Table 2 with the reference sample along with those of the present invention.

Example 5

Permeation Test

Figure 3:
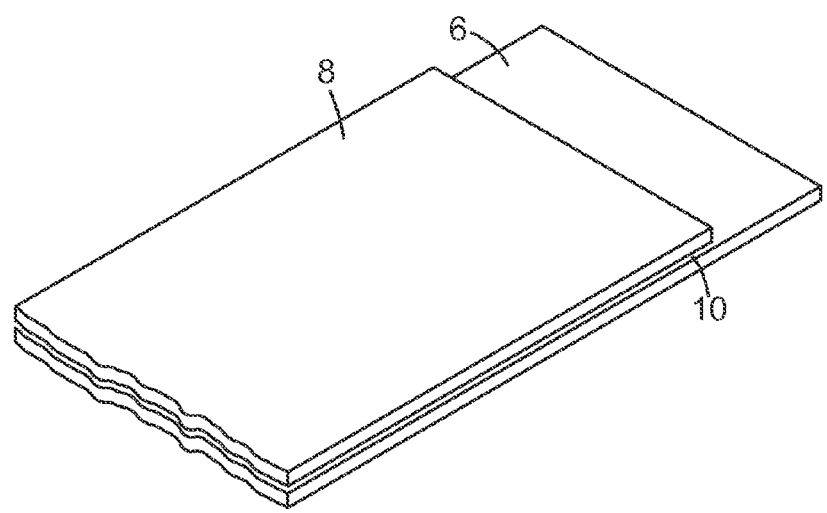
FIG. 3: Perspective view of an exemplary test piece for the permeation test.
Figure 4A:
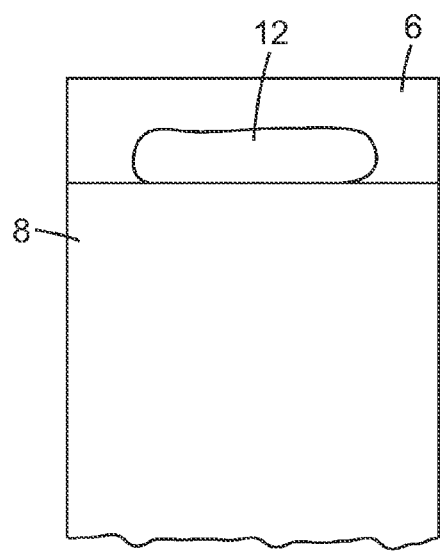
FIG. 4a: Plan view of the test piece of FIG. 3 at the beginning of the permeation test.
Figure 4B:
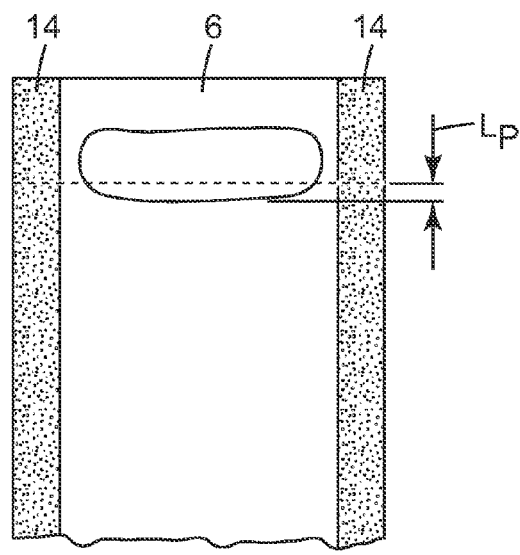
FIG. 4b: Plan view of the test piece of FIG. 4a at the end of the permeation test, with the top plate removed.

Each test piece includes a top plate 6 and bottom plate 8 kept matched and separated with 100 micron gap 10 therebetween, as represented in FIG. 3. Two strips of pressure sensitive adhesive 14 are positioned between and along the edge on either side of the plates 6 and 8 to maintain the gap 10. 2 ml test material 12 heated at 40° C. is dropped from the top end and the permeation length Lp (mm) is measured after keeping it for 24 hours at 20° C. The test is illustrated in FIGS. 4*a* and 4*b*. The results of the 5% salt spray test are tabulated in Table 2 with the reference sample along with those of the present invention.

Example 6

Viscosity Stability Test

The viscosity stability of the composition of the present invention was evaluated over a wide temperature range simulating both tropical and sub-tropical environment application conditions. Maintenance of a stable application viscosity was observed in the range of −10° C. to 100° C. Graphical representation of the results is depicted in FIG. 2.

While the present invention has been described herein with some specificity, and with reference to certain preferred embodiments thereof, those of ordinary skill in the art will recognize numerous variations, modifications and substitutions of that which has been described which can be made, and which are within the scope and spirit of the invention. It is intended that all of these modifications and variations be within the scope of the present invention as described and claimed herein, and that the invention be limited only by the scope of the claims which follow, and that such claims be interpreted as broadly as is reasonable.

We claim:
1. An anti-corrosive composition comprising:
an active material of formula

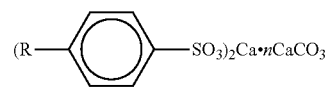

wherein R is an aliphatic chain of $C_{12}$ to $C_{20}$ and $n \leq 20$;
an anti-corrosive pigment:
a filler: and
a diluent or carrier.
2. The composition as claimed in claim 1, wherein the active material is present in an amount of 30-45 parts by weight of the composition.
3. The composition as claimed in claim 1, wherein the composition comprises at least one part by weight of the anti-corrosive pigment.
4. The composition as claimed in claim 1, wherein the filler is present in an amount of 35 to 40 parts by weight of the composition.
5. The composition as claimed in claim 1, wherein the anticorrosive pigment is an oxyaminophosphate salt of magnesium.
6. The composition as claimed in claim 1, wherein the filler is $SiO_2$—$Al_2[(OH)_4Si_2O_5)]$.
7. The composition as claimed in claim 1, wherein the diluent is present in an amount of at least 10 parts by weight of the anti-corrosive composition.
8. The composition as claimed in claim 1, wherein the diluent or carrier is a mineral oil.
9. The composition as claimed in claim 8 wherein the mineral oil is clear colorless liquid, preferably a liquid hydrocarbon mixture.
10. The composition as claimed in claim 1, wherein the composition has a stable viscosity over a temperature of −10° C. to 100° C.
11. A metal substrate having a coating comprising the anti-corrosive composition as claimed in claim 1.
12. A method of protecting a surface from corrosion, said method comprising:
applying the composition as claimed in claim 1 so as to coat the surface.
13. A process for preparing an anti-corrosive composition, comprising the steps of stirring the active material of formula

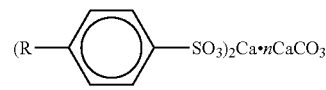

wherein R is an aliphatic chain of $C_{12}$ to $C_{20}$ and $n \leq 20$; adding an anti-corrosive pigment and a filler mixture slowly enough to the stirred active material so that they disperses quickly in active material and mixed and stirred to form a blend; adding a mineral oil and mixing it followed by filtering the resulting product through a 300 mesh filter.

14. The process as claimed in claim 13 wherein at every process step, the formed blend is dispersed thoroughly before each ingredient is added.

15. An anti-corrosive composition comprising:
an active material of formula

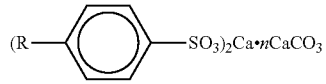

wherein R is an aliphatic chain of $C_{12}$ to $C_{20}$ and $n \leq 20$, and the active material is present in an amount of 30-45 parts by weight of the composition;
an anti-corrosive pigment;
a filler present in an amount of 35 to 40 parts by weight of the composition; and
a diluent or carrier present in an amount of at least 10 parts by weight of the anti-corrosive composition, wherein the composition comprises at least one part by weight of the anti-corrosive pigment.

16. The composition as claimed in claim 15, wherein the anticorrosive pigment is an oxyaminophosphate salt of magnesium.

17. The composition as claimed in claim 16, wherein the filler mixture is $SiO_2$—$Al_2[(OH)_4Si_2O_5)]$.

18. The composition as claimed in claim 15, wherein the filler mixture is $SiO_2$—$Al_2[(OH)_4Si_2O_5)]$.

19. The composition as claimed in claim 17, wherein the diluent or carrier is a mineral oil.

20. The composition as claimed in claim 15, wherein the diluent or carrier is a mineral oil.

21. A metal substrate having a coating comprising the anti-corrosive composition as claimed in claim 19.

22. A method of protecting a surface from corrosion, said method comprising:
applying the composition as claimed in claim 15 so as to coat the surface.

* * * * *

UNITED STATES PATENT AND TRADEMARK OFFICE
CERTIFICATE OF CORRECTION

PATENT NO. : 8,911,542 B2  Page 1 of 1
APPLICATION NO. : 13/994149
DATED : December 16, 2014
INVENTOR(S) : Soni et al.

It is certified that error appears in the above-identified patent and that said Letters Patent is hereby corrected as shown below:

In the claims

Col. 10, line 44, claim 9, after "oil is" delete "clear colorless liquid, preferably"

Signed and Sealed this
Twenty-second Day of March, 2016

Michelle K. Lee
*Director of the United States Patent and Trademark Office*